C. H. GRIFFIN.
ORE ROASTER.
No. 44,769. Patented Oct. 18, 1864.
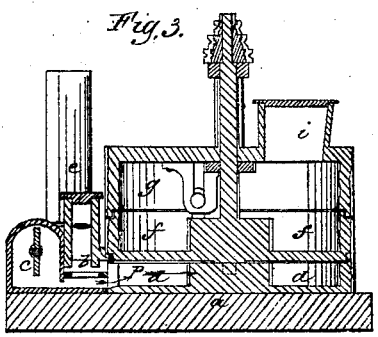
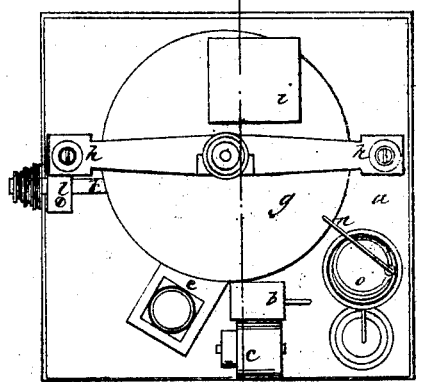
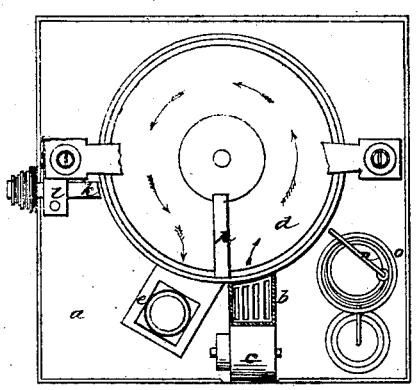
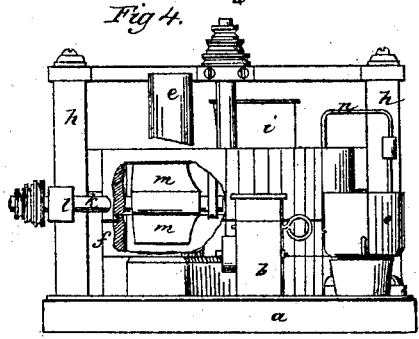
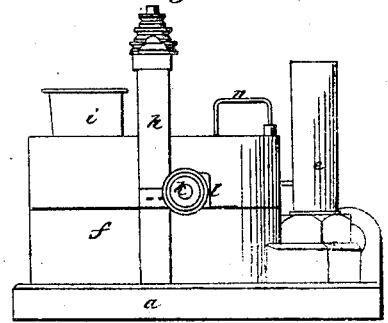
Inventor
C H Griffin

UNITED STATES PATENT OFFICE.

C. H. GRIFFIN, OF CHELSEA, ASSIGNOR TO HIMSELF AND HENRY A. BREED, OF LYNN, MASSACHUSETTS.

IMPROVED ORE-ROASTER.

Specification forming part of Letters Patent No. 44,769, dated October 18, 1864.

*To all whom it may concern:*

Be it known that I, C. H. GRIFFIN, of Chelsea, in the county of Suffolk and State of Massachusetts, have invented an Improved Desulphurizer or Ore-Roaster; and I do hereby declare that the following, taken in connection with the drawings which accompany and form part of this specification, is a description of my invention sufficient to enable those skilled in the art to practice it.

This invention relates to the construction of ovens or furnaces for roasting ores, the improvement consisting in the construction and arrangement of the roasting-pan with reference to the flue of the furnace, and in combining with a rotary pan a mechanism for stirring the powdered or crushed ore contained therein.

The object of a roasting apparatus, as is well understood, is to desulphurize the ores, by heating them, in a subdivided or finely-divided condition, in contact with oxygen, thereby freeing the sulphurets.

As my invention, however, does not relate to the chemical action of heat upon the ores to desulphurize them, such action need not be further particularly referred to, it being only necessary to remark that in the process of roasting it is desirable to thoroughly and equally heat the whole mass of ore contained in the roaster without fusing the same, and with my apparatus it is designed to keep the ore while being roasted in a comparatively close vessel, into which, however, air enough is to be admitted to oxidize the ore.

Figure 1 of the drawings represents a top view of my apparatus; Fig. 2, a side elevation of the same; Fig. 3, a vertical section taken in the line $x\ x$ of Fig. 1; Fig. 4, a front elevation with a part of the apparatus broken away to show the stirrer; Fig. 5, a top view of the furnace and flue.

$a$ denotes the foundation, upon which is erected a furnace, $b$, having a fan-blower, $c$. This furnace opens into a shallow circular flue-chamber, $d$, the heat and other volatile products of combustion passing around the same in the direction of the arrows (see Fig. 5) and thence into and through the chimney $e$. Fitting upon or over this flue-chamber is a circular pan or roaster, $f$, from the center of which rises a vertical shaft, to which rotary motion is imparted to give a horizontal rotary movement to the pan over the furnace-flue, bringing all parts of the surface of the pan equally to the action of the heat from the furnace. This pan is surmounted by a stationary cover, $g$, which is made capable of vertical movement in guide-posts $h$. Through a hopper, $i$, in this cover, the pan is charged with ore, and a conductor or chute from the apparatus, which pulverizes the ore, may be connected with or led directly into this charging-hopper. To remove the roasted and desulphurized ore, the cover $g$ is raised until free access can be had to the interior of the pan $f$. A rotary shaft, $k$, passes through the cover $g$, as seen in Fig. 4, this shaft being supported in a bearing, $l$, and in the side of the cover. On its inner end it bears one or more radial arms, $m$, which in their rotation extend down to or nearly to the bottom of the pan. Rotary motion is given to the shaft and arms in any desirable manner, the arms rotating simultaneously with the movement of the pan, and it will be obvious that the action of the arms in contact with the mass of ore will thoroughly turn over and stir up the mass, so as to bring all parts thereof against the heated surface of the pan.

It is intended to use this apparatus principally in the treatment of ores which have been crushed to powder, but it may, of course, be employed for roasting ores which are less finely divided. A pipe, $n$, may lead from the cover $g$ into or through a tub or cistern, $o$, containing water, to condense the gases which flow through the pipe. The air to oxidize the ore passes in through the joint between the pan and the cover, which fits sufficiently loose for this purpose, or a pipe may lead from the roaster through the cover $g$, as may be desirable. A partition, $p$, is placed across the flue, dividing the part thereof adjacent to the furnace-opening from that part adjacent to the chimney.

I claim—

1. The combination of the rotary pan or roaster with the furnace-flue passing around under the same, substantially as described.

2. In combination with the rotating pan, the rotary arms $m$, operating in the manner and for the purpose substantially as set forth.

In testimony whereof I have hereunto set my signature this 21st day of September, A. D. 1864.

C. H. GRIFFIN.

Witnesses:
F. GOULD,
J. B. CROSBY.